United States Patent [19]

Bicevskis et al.

[11] Patent Number: 5,796,960
[45] Date of Patent: Aug. 18, 1998

[54] MULTI-MEDIA COMPUTER ARCHITECTURE

[75] Inventors: Robert P. Bicevskis, Richmond Hill; Adrian H. Hartog, Toronto; Gordon Caruk, Bramalea; Michael A. Alford, Ajax, all of Canada

[73] Assignee: ATI Technologies, Inc., Ontario, Canada

[21] Appl. No.: 452,318

[22] Filed: May 26, 1995

Related U.S. Application Data

[62] Division of Ser. No. 92,477, Jul. 16, 1993, abandoned.

[51] Int. Cl.$^6$ ............................................ G06F 13/00
[52] U.S. Cl. ......................... 395/286; 395/511; 395/304
[58] Field of Search ............................. 395/304, 286, 395/511

[56] References Cited

U.S. PATENT DOCUMENTS 5,276,887  1/1994  Haynie ............................. 395/725
5,335,321  8/1994  Harvey et al. ..................... 395/162
5,461,679 10/1995  Normile et al. ................... 382/304

*Primary Examiner*—Jack B. Harvey
*Assistant Examiner*—David A. Wiley
*Attorney, Agent, or Firm*—Antonelli, Terry, Stout, & Kraus, LLP

[57] ABSTRACT

A computer system is comprised of at least one of a main bus and an attached expansion bus, a CPU connected to the main bus, peripherals connected to one of the main bus or to the expansion buses, a subsystem connected to a bus for receiving control, address and data signals from the CPU comprising a graphics controller, a data compression circuit, a video controller, a memory connected to data input ports of the circuits and controllers via a subsystem bus having a bandwidth sufficient to carry video and graphics display signals, a first arbiter for determining which controller is permitted access the memory, a link bus connecting each of the controllers, and apparatus for providing polling signals to each of the controllers and circuits on the link bus and for receiving acknowledgement signals therefrom, and thereby synchronizing and allowing exchange of control information between the controllers and circuits.

2 Claims, 7 Drawing Sheets

MULTI-MEDIA COMPUTER ARCHITECTURE

This is a divisional of application Ser. No. 08/092,477, filed Jul. 16, 1993, now abandoned.

FIELD OF THE INVENTION

This invention relates to computer structures and particularly to a computer architecture for facilitating processing of multi-media data.

BACKGROUND TO THE INVENTION

While desk top computers were originally designed to process numerical, alphanumerical and graphical data, in recent years such computers, have been called upon to process video signals producing a multi-media result. This involves translating analog video signals into digital signals, processing the digital signals usually with other digital signals within the computer, then translating the processed signals into one or both of two types of signals for display: one type of signal for display on a local computer monitor, the other type of signal for a video display, for translation back to analog and display on a standard television set, e.g. conforming to NTSC standard.

The interlace (if used) and frame rates used on a local computer monitor usually do not conform to the interlace and frame rate requirements of a standard television set. Furthermore, the typical four to eight mb/s bus data rate of the desk top computer (ISA Bus) cannot accommodate the high data rate (typically 20 mb/s) required for full screen motion video data signals. In addition the computer central processing unit (CPU) is required to deal both with processing of the high data rate video requirements having a high interrupt frequency as well as the slower data rate requirements of the other computer peripherals such as disk drives, serial interface devices such as a modem, mouse, etc. The result is a computer with low speed of operation and very limited video capabilities.

For example, it may be desired to input two video signals, one showing a panning background, and the other containing actors. A graphics signal such as a words in a balloon, a cartoon character, etc. generated at the local computer and stored on a local hard disk drive, controllable by a mouse, is required to be merged with the two video signals, to produce a composite containing the actors, the moving background, a cartoon character and words in a cartoon balloon in the same picture. A local monitor is required to display all of the above in separate windows and the composite in a fourth window, along with a cursor character controlled by the mouse. Only the composite picture is required to be fed out to an external video port for display on a monitor and/or recording on a VCR. This complex operation has been virtually impossible to be performed in real time with appropriate frame rates, using an ISA bus based computer.

In order to improve operation, some computers have been designed with two buses, a standard expansion bus (ISA, EISA, or MCA) and another higher speed bus (VESA, or PCI). The lower speed bus is incorporated for compatibility reasons, while the higher speed bus is present for performance reasons. The buses are connected together through a controller. The low data rate devices, such as a CD-ROM, floppy disk, serial interfaces, etc. are connected to the low data rate bus. The CPU, graphics controller circuit which connects to a monitor are connected to the high data rate bus. The video input/output circuits are currently connected to the low data rate bus.

While this structure could facilitate the processing of video if the high data rate video devices were connected to the high data rate bus, it has been found that the CPU would be very intensively used, and it would service the low data rate devices connected to the standard low data rate bus only poorly. The result, when processing video, for example, would be extremely small images, jerky cursor positioning, slow access of data from the hard disk drive, etc.

In a multi-media system, data needs to be moved from one card (controller) to another. There are a number of common methods for moving data from one computer 'card' to another, which are: host, DMA (Direct Memory Access), and bus mastering. With most of the data transfer methods, the effective bus bandwidth is further reduced by a factor of two. For instance, if the host is transferring data from one card to another, it first needs to read the data from one card (one bus cycle) and then needs to write the data to another card (another bus cycle.) Two bus cycles are required for each transfer, and thus only half the effective data rate is achievable. Even if the host processor were on a local bus (e.g. VESA) and the peripheral cards were on an expansion bus (e.g. ISA) both buses need to be involved in the data transfers and the performance of the local bus is chained to the lower speed of the expansion bus.

The use of a DMA controller is one way of isolating activity from a local bus. The DMA controller is configured by the CPU to independently transfer data from one card to another. Although there can be some improvement with this method, there still needs to be two bus cycles on the expansion bus (one read, one write), and there is still the host overhead of setting up the DMA controller.

Bus Mastering is a method whereby a peripheral device can take control of the expansion or local bus (whichever the master is connected to). The device, or card, needs to have the 'intelligence' to take control of the bus and then independently read data from some other card. This method solves the problem of two bus cycles being required to transfer one piece of data, but the added cost and complexity have prevented all but a few selected cards from implementing this technique. To further compound the problems, there is no industry standard specification for the ISA bus and compatibility for bus mastering is a major unresolved issue.

SUMMARY OF THE INVENTION

The present invention provides a high data rate, multi-media subsystem which can transfer data at an extremely high rate, e.g. at 200 mb/s, sufficient for a wide video channel. The subsystem does not require the use of the computer CPU. The computer CPU remains connected to its standard local or expansion bus, and thus can service the requirements of the computer other than multi-media and the significantly reduced interrupts from the subsystem, with high efficiency. The multi-media subsystem does not draw processing time from the CPU other than as in a normal system. The CPU and the multi-media subsystem communicate at a low data rate, e.g. when data from the disk drive is to be provided to/from the subsystem graphics controller, compression engine or video sub-system.

The present invention thus provides a system in which the multi-medium subsystem is synchronized and operates without requiring main computer processor interrupts or intervention for its high data rate operation.

In accordance with an embodiment of the invention, a computer system is comprised of at least one of a main bus and expansion bus, a CPU and peripherals connected to either bus, a subsystem connected to either bus for receiving control signals from the CPU comprising a graphics controller circuit, a data compression circuit, a video input circuit, a memory connected to data input ports of the circuits via a separate subsystem bus having a bandwidth sufficient to carry video and graphics display signals, an external arbiter for designating which of the circuits may access the memory via the subsystem bus, and a link bus connecting each of the circuits. The link bus preferably has its own internal arbiter in one of the circuits providing polling signals to each of the other circuits via the link bus and receiving acknowledgment signals therefrom.

BRIEF INTRODUCTION TO THE DRAWINGS

A better understanding of the invention will be obtained by reference to the detailed description below, in conjunction with the following drawings, in which:

FIGS. 1, 2, and 2A are block diagrams of desk top computer systems in accordance with the prior art, FIG. 3 is a block diagram of a computer system in accordance with the present invention, FIG. 4 illustrates the timing relationship between clock and data on the link bus, FIG. 5 illustrates the data and clock wave forms during the release interval of a device to the link bus, FIG. 6 illustrates a data packet transmitted by the arbiter and by a receiving device connected to the link bus, in the case that an invitation to transmit is accepted by a device, FIG. 7 illustrates a data packet initiated by the arbiter and from a device having accepted an invitation to transmit, and in which an event includes a service acknowledgment from the target device, FIG. 8 illustrates a data packet initiated by the arbiter in which there is an invitation to a target device which is not accepted, FIG. 9 illustrates a schematic diagram of the subsystem memory organization, FIG. 10 illustrates the connections that a memory unit or device should have in order to fit into the memory matrix of FIG. 9, and FIG. 11 illustrates timing diagrams of signals demonstrating the method used to transfer ownership of the shared memory from one device to another.

DETAILED DESCRIPTION OF THE PRESENT INVENTION

Figure 1:
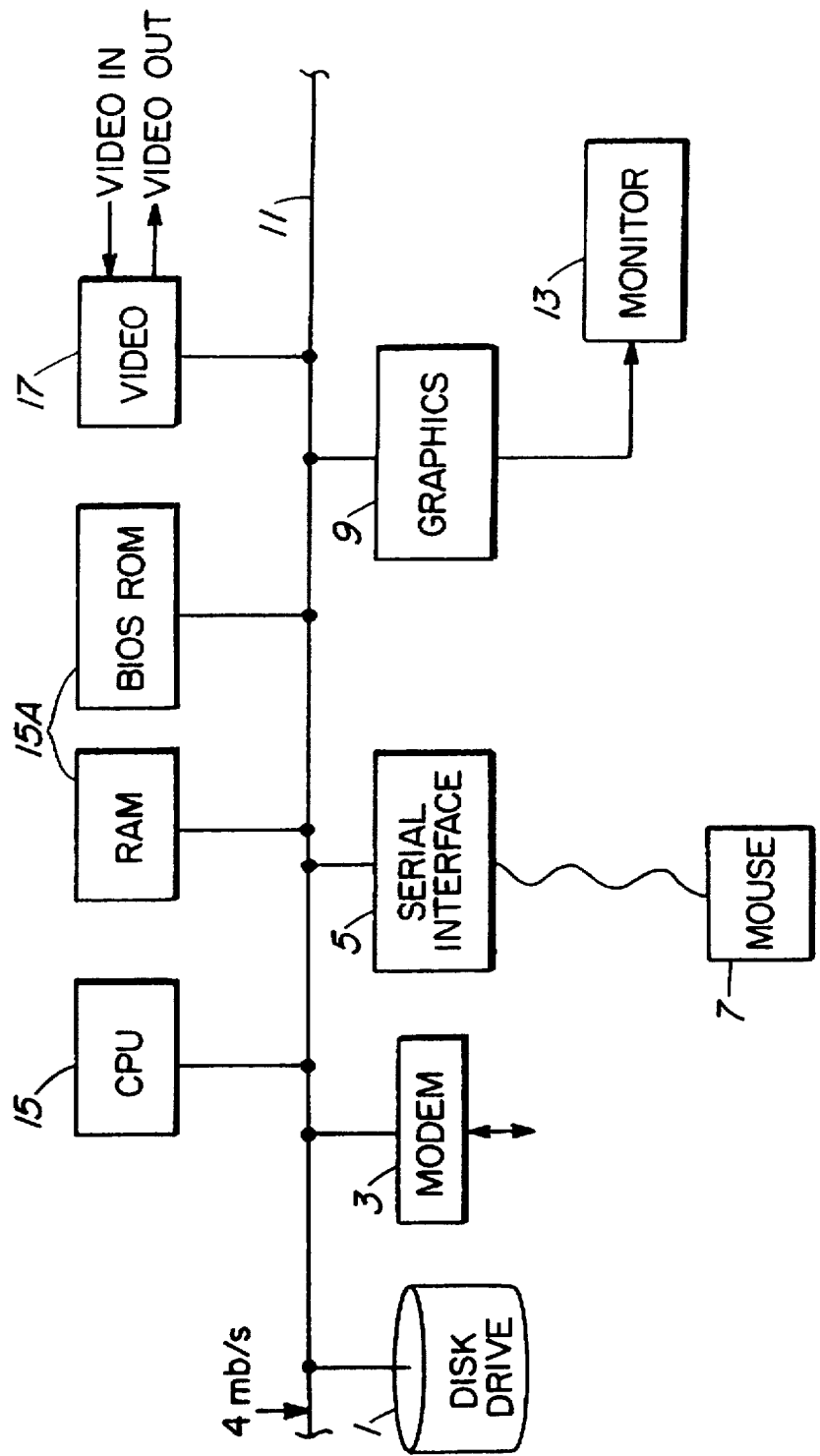

FIG. 1 illustrates a desk top computer system, in block diagram in accordance with the prior art. Various peripheral devices, such as disk drive 1, serial interface and modem 3, serial interface 5 connected to a mouse 7, and a graphics controller 9 are connected to a main system bus 11. A monitor 13 is connected to the graphics controller 9. A microprocessor (CPU) 15, and associated random access main memory and BIOS ROM 15A are connected to the bus 11.

A system such as the above is described in the book "Microcomputer Primer" by Mitchell Waite and Michael Pardee, published by Howard W. Sams & Co. Inc. while the addition of a graphics controller 9 is not described in the aforenoted book, it is described in the book "Graphics Programming for the 8514/A" by Jake Richter and Bud Smith, published by M&T Publishing Inc., copyright 1990, and its interface to the main bus is shown, for example, in a block diagram on page 190 thereof.

In the case in which a video signal coming from a TV camera, video tape recorder, video disk, etc., in analog form must be mixed with graphics or other data within the computer system, a video circuit 17 is connected to the bus 11. The video circuit 17 converts the analog video to digital and which signal is processed and mixed with graphics signals within the system. Such a system is described for example in the text book "Fundamentals of Interactive Computer Graphics" by J. D. Foley and A. Van Dam, copyright 1982 and published by Addison-Wesley Publishing Co. Inc., particularly on pages 494 and 495. The text mentions that since the bandwidth of the NTSC signal (the video signal to be processed) does not match that of a 512 pixel per scan-line image used in the computer monitor, sharp color translations are usually blurred, causing loss of detail. This is only one of the problems of the system. Since television images converted to digital are at 20 mb/s, it is impossible for the CPU to deal with the video data on a pixel by pixel basis. Thus only reduced resolution images can be processed, and at a slow rate, due to the low (typically 4 mb/s) data rate of bus 11.

In addition, the CPU must attend to controlling the graphics controller 9, dealing with all the other peripherals connected to the bus, and must as well attend to the video data to be processed. Consequently the CPU reaches the limit of being able to deal with the data, and the computer system as a results operates very slowly and provides a poor result.

Figure 2:
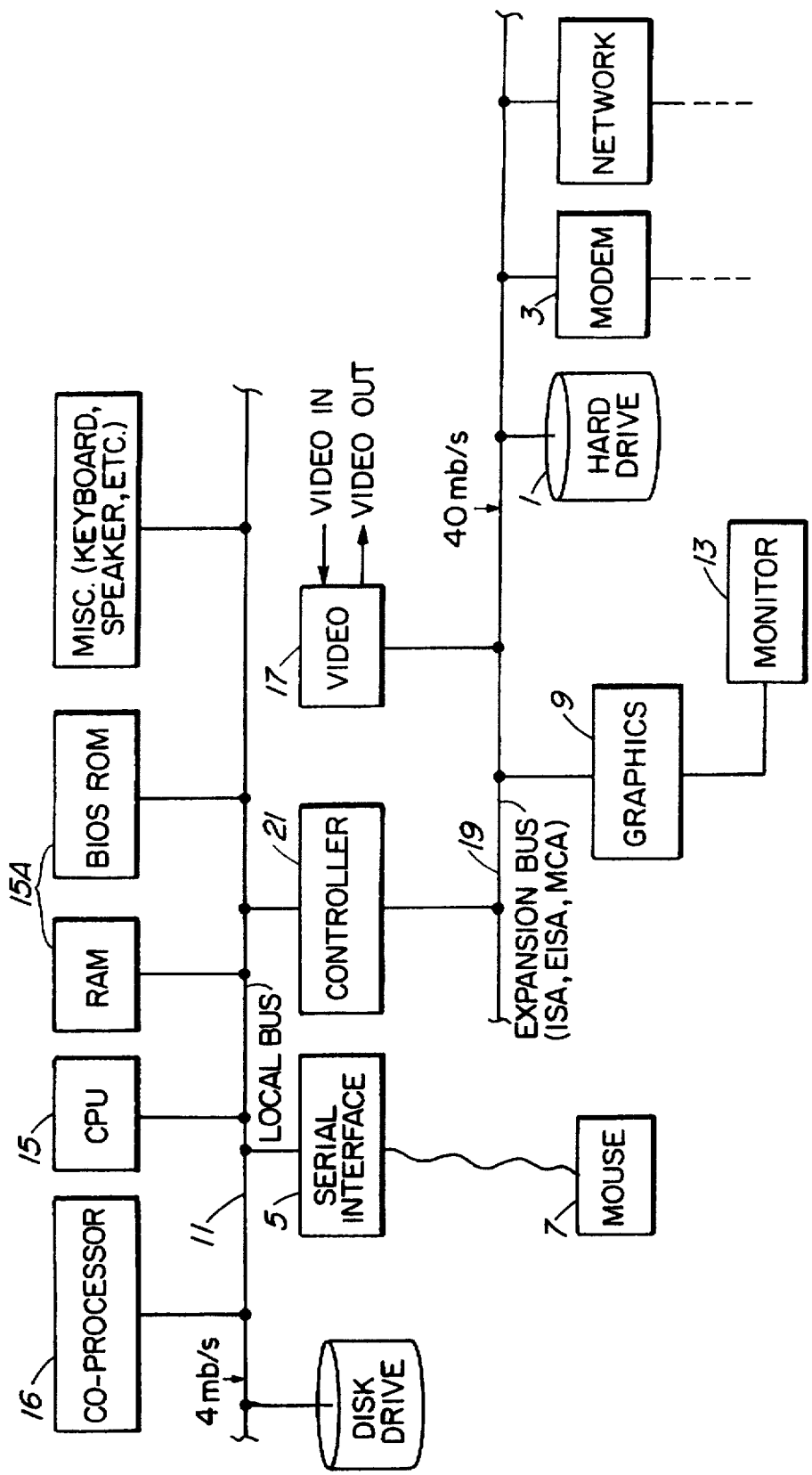

In an attempt to overcome the above-noted limitations, as shown in FIG. 2 a subsidiary expansion bus 19 was introduced, operating at typically 40 to 100 mb/s, which is sufficiently high to handle video data signals. Bus 19 and bus 11 are interconnected by a controller 21. The low data rate devices such as the disk drive, modem 3 and serial port 5 are connected to bus 11 while the video circuit 17 and graphics controller 9 are connected to bus 19. In addition, the CPU 15 is connected to bus 19 in order to service the demands of video circuit 17.

While the system described in FIG. 2 could process the video data successfully on a pixel by pixel basis since CPU 15 is connected to video circuit 17 via the high data rate bus 19, it still suffered from a significant problem. Since the CPU 15 is so busy servicing the video data, it has insufficient time available to efficiently service the lower data rate peripherals connected to bus 11. The result is for example jerky movement of a cursor displayed on the monitor (since movement of the mouse could only be detected by the CPU at infrequent intervals), and slow and erratic accessing of data from hard disk drive 1. While very basic video processing could be accomplished with such a system, it is severely limited and extremely difficult to expand.

Figure 2A:
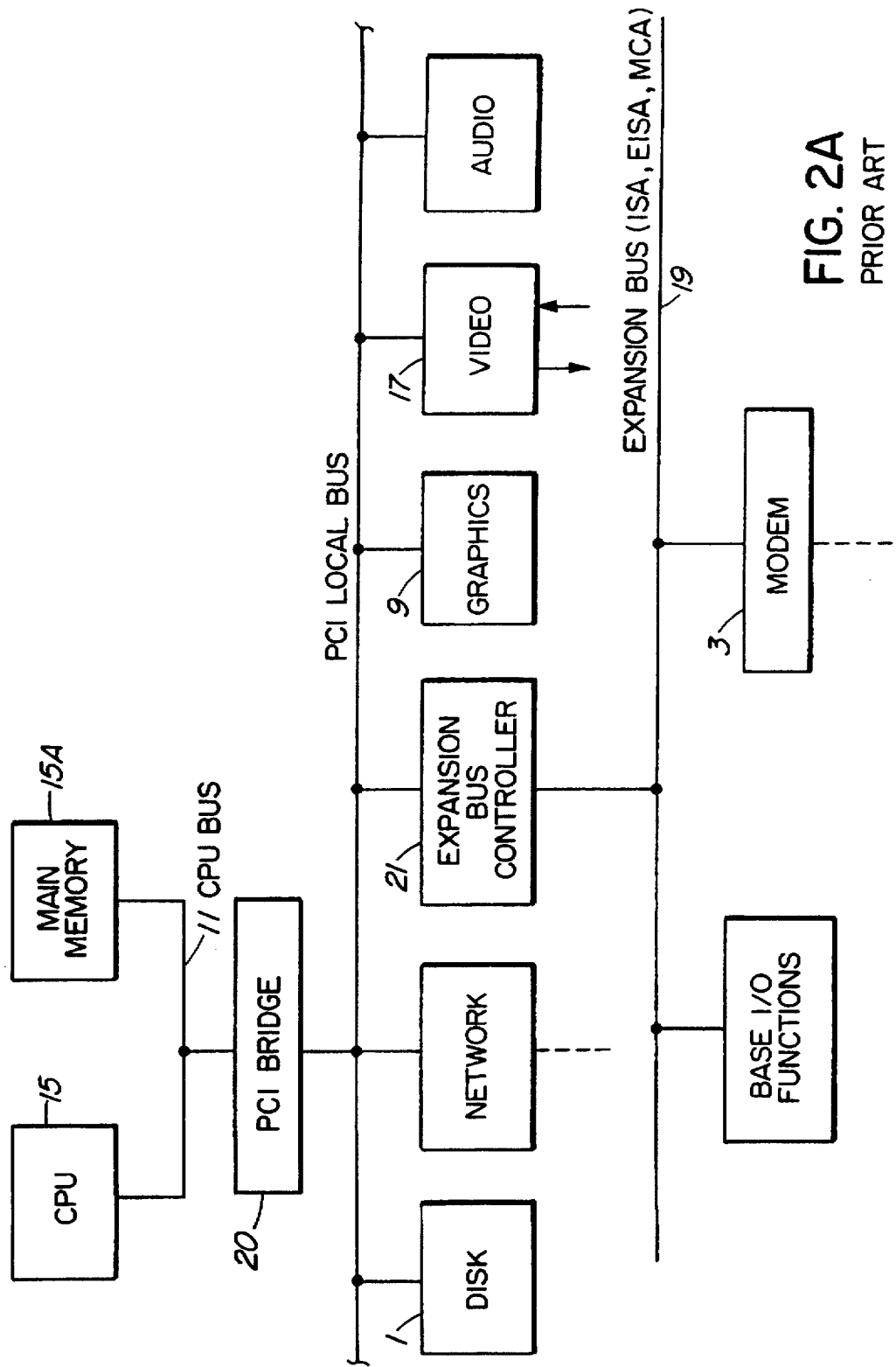

FIG. 2A shows another prior art type of system, using a PCI local bus. It has an expansion bus 19 of the ISA/EISA/MCA type, which has proved to be satisfactory for low speed peripherals, and it is backward compatible. There is a local bus to which the CPU is connected, which allows the CPU to operate more or less independently of the rest of the system and of the PCI bus, which is a next generation high speed expansion bus.

The bandwidth of the PCI bus is about 12–120 mb/sec, while the expansion bus typically has speed of 4- mb/sec. if it is ISA, 8–30 mb/sec. if it is EISA, and 10–40 mb/sec. if it is MCA. The speed of the CPU local bus is a function of the CPU.

In the PCI bus case, only the CPU, memory and a PCI bridge 20 are connected to the (slotless) CPU local bus, which bus operates at whatever speed the CPU runs at. The PCI bus runs at one speed, and accepts cards (circuits). The expansion bus is one of the standard expansion buses.

It may be seen that a local bus system is basically in standard personal computer form (FIG. 1), with extra functionality on the CPU local bus. There are two buses, with the standard expansion bus remaining. Prior to production of the VESA standard, some functions, such as graphics were added directly to the local bus, via a non-standard connector, or by direct connection to the computer motherboard. The VESA standard defines electrical/mechanical specifications for the computer slots. Any card (circuit) that was connected to the expansion bus could, with redesign, be moved to the local bus, although so far only data intensive sub-systems have been moved, such as graphics, hard disk controller and network interface.

Figure 3:
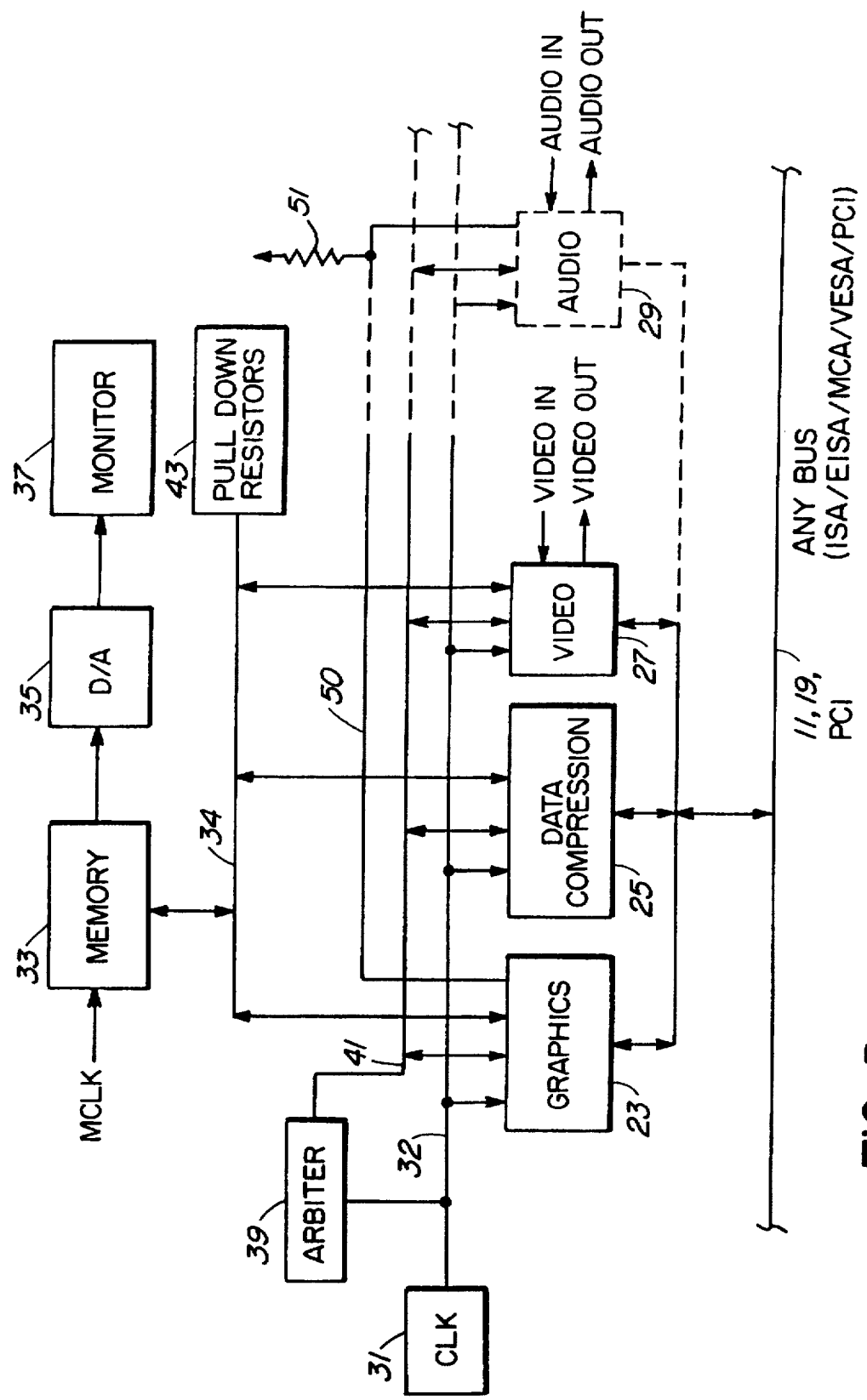

A preferred embodiment of the present invention is shown in block diagram in FIG. 3. This system completely eliminates the heavy load placed on the CPU to deal with video or other multi-media data, while facilitating processing and display of multi-media data in a highly efficient manner. The result is the ability to provide clean sharp video data mixed with graphical data where desired, and efficient servicing of the low data rate peripherals.

Low data rate peripherals such as disk drive 1, serial port 5 and modem 3 are connected to low data rate bus 11 as in the prior art system shown in FIG. 1. In addition, the CPU 15 with associated random access memory 16 are connected to bus 11 as shown in FIG. 1.

Various multi-media controllers are connected for receiving low data rate signals and instructions to bus 11, for example, graphics controller 23, data compression circuit 25 and video controller 27. In addition, other multi-media type circuits can be connected to bus 11, such as audio circuit 29, etc.

A high data rate clock 31, operating at 50 Mhz in a successful prototype, is connected to clock inputs of the circuits 23, 25, 27, etc. Data input and output ports of the 23, 25 and 27 circuits are connected via a common bus 34 to memory 33. With standard VRAMS or DRAMS this configuration provides a memory bus with a 200 mb/s capacity. The memory 33 can be composed of VRAM or DRAM. The VRAM portion of memory 33 is connected to a digital to analog converter 35, the analog output of which is connected to monitor 37.

At least one of the circuits 23, 25, 27, 29 preferably contains a link bus arbiter which connects to the two wire link bus 50. This function can be included in arbiter 39. If more than one device has a version of the arbiter built in, software can program the system such that only one arbiter is active at any time. The link bus arbiter 39 is used to time multiplex the link bus so that the circuits 23, 25, 27, and 29 can send messages between themselves.

The shared memory signals on bus 34 are controlled by pull up/down resistors or sticky latches 43, to ensure that no spurious memory cycles are initiated when control of the memory is switched from one device 23, 25, 27, 29 to another. In a similar manner, the link bus is controlled with pull-up resistors 51.

The graphics controller can be for example the type 68800 graphics controller, manufactured by ATI Technologies Inc. of Toronto, Canada. The data compression circuit 25 can be type 82750PD video compression chip manufactured by Intel Corporation. The video controller 27 can be as simple as an analog to digital converter, or an analog to digital converter and a digital to analog converter, or a more complex circuit such as one which does scaling, synchronization, etc. Each of these circuits should have appropriate interfaces connecting it to the various buses, in a well known manner; the interface circuit used depends on the particular type chip which is selected.

The graphics controller 23 maintains the display on monitor 37. Each of the devices 23, 25 and 27 has a dedicated portion of memory 33; memory 33 includes VRAM for storing the data for display in monitor 37. The remainder of memory 33 should be dynamic RAM, VRAM or a combination of both.

Each of the devices 23, 25 and 27 contains a FIFO, from which a message to the other devices 23, 25 and 27 ... 29 is sent and firmware for controlling operation thereof in accordance with specific events to be enacted. Link bus 50 provides a high speed method of synchronizing audio/video events without relying on the use of interrupts to host CPU 15. Bus 50 preferably is a time multiplexed serial bus wherein each device connected to the bus has an opportunity to transmit a 16 bit message to the other devices on the bus.

Aside from the high data rate bus 34 connected to memory 33, six terminals are required on each of the devices 23, 25, 27 ... 29 for operation in this architecture, one terminal for the master memory clock, two terminals for the connection to the link bus (one clock, one data), and three terminals for the memory arbiter (two request lines and one grant line).

The function of the link bus arbiter 39 is to poll for requests from all devices connected to the link bus 50. Polling for requests is accomplished by transmitting a series of "invitations", one for each device identification (ID) in the subsystem.

While only a single arbiter 39 is required in the system, it is preferred that any of the devices 23–27 should be capable of functioning in this capacity as determined by software during device initialization.

The arbiter 39 should constantly cycle through a series of invitations which are transmitted on bus 41 to allow each device on the bus to use a brief time slot for signaling other devices in the system. In accordance with a successful prototype, an invitation begins with a start bit and is followed by a device ID—an "invitation" to send (see FIG. 6). All devices should receive the ID and decode its value. The device that matches the invitation ID can then choose to accept the invitation by asserting an invitation acknowledge bit into the bit stream. Following the invitation acknowledge the selected device then broadcasts its signal event which represents some form of status or message. The significance of these messages is decoded by all devices on the link bus 50 and are acted upon by the appropriate target device(s). The arbiter should cycle through all of the device IDs that are connected to bus 50 so that each device has an opportunity to broadcast a message on bus 50. Messages or "signal events" are 16 bit fields divided into a 4 bit function code and a 12 bit data field.

Figure 4:
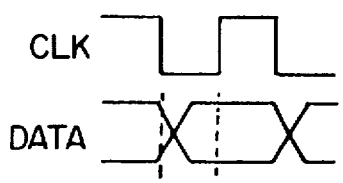

In order to eliminate clock skew problems it is preferred that all devices should clock their outputs using the negative edge of the link bus 50 clock and should sample the incoming data using the rising edge of the same clock, as shown in FIG. 4. The data itself is preferably active low. That is, a logical "1" is represented by the physical bus being at a low voltage approaching 0 volts. When the data is de-asserted or undriven it approaches the 5 V level. A pull up resistor 51 is used to maintain the signal in its de-asserted or logical "0" state. A start bit is therefor a logical "1". The clock itself preferably operates between 8.0 and 8.33 MHz with a symmetrical duty cycle, constantly driven by the system arbiter.

Figure 5:
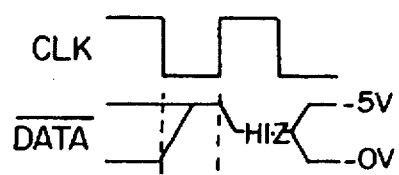

Each device is preferably connected to the bus 50 using a bi-directional driver and can only drive the bus when invited by the arbiter or to acknowledge a "service request". A "switch over" bit is inserted whenever a device releases the bus, by switching off its 3-state driver, and another device asserts data onto the same line. During this time all devices must be in the high impedance state. However, the device that is releasing the bus should first drive the data to a logical zero (high voltage) before releasing to the high impedance state. This insures that the signal will be precharged so that acknowledge bits will default correctly to the de-asserted level. As a result only a nominal pull up resistor 51 is required to maintain a logical "zero" on the line (see FIG. 5). The precharging is done for one half a clock cycle after the falling edge of the clock on the cycle that the signal is to be released. This allows the driver another half clock interval to release the bus before the next driver can begin to assert itself.

Figure 6:
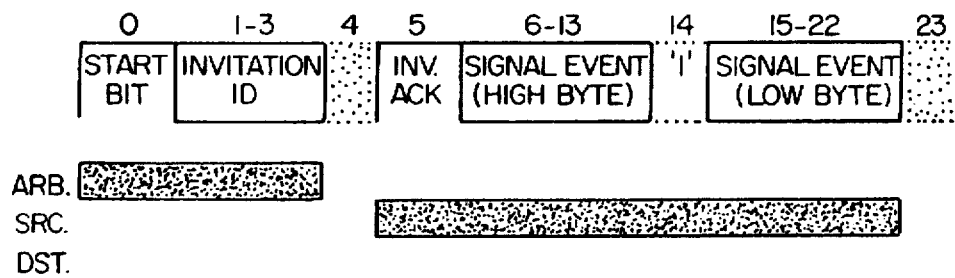

A typical data packet transmission on bus 50 begins when the arbiter transmits an invitation composed of a start bit (bit 0) followed by a 3 bit invitation ID (bits 1–3) as shown in FIG. 6. It then releases the bus on cycle 4 leaving the bus in the de-asserted state. The device with a matching ID then takes over the bus and asserts an invitation acknowledge (bit 5) to indicate that it will commence transmission of the signal event (bits 6–13, 15–22). Bit 23 provides a switch over bit to allow the arbiter to take over and begin the next invitation.

Figure 7:
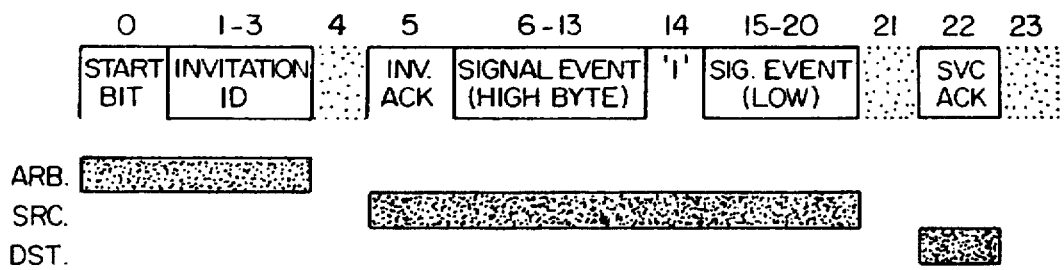

In some cases a signal event from the invited source will require an acknowledgment from the designation or target of the signal event. In this case the service acknowledgment will be driven from the target at bit location 22 as shown in FIG. 7. Bit 21 is then used as a switch over time duration for the source of the signal event to release the bus to the target. Acknowledgment of a service request is required since devices may have very limited (or no) queuing capabilities. A true acknowledge ("1") then indicates that the target of the service request either has room in its request queue or it isn't busy performing a service and can therefor accept another request. When a request isn't acknowledged, the requester can retry each time it is invited to use the bus until the request is acknowledged.

Figure 8:
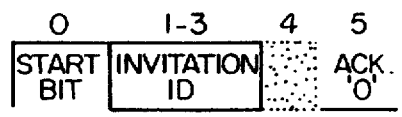

Most of the time the link bus 50 will contain only circulating invitations from the arbiter with no device actually accepting the invitations. In these cases the signal event portion of the packet is skipped and the packet is abbreviated. It is the responsibility of each device on the bus to monitor the invitation acknowledge of each invitation to determine when to begin looking for the next start bit. The abbreviated packet is depicted in FIG. 8.

A more detailed description of preferred data packet bit fields is given below:

| BIT | DESCRIPTION |
|---|---|
| 0 | Start bit<br>* always "1"<br>* all devices synchronize to the leading edge of this bit<br>* driven by arbiter |
| 1–3 | Invitation ID<br>* indicates which device has control during bits 5–22<br>* bit 1 is the most significant bit of the ID<br>* 0–7 (bits 1–3 = 000–111) are available as valid device ID<br>* driven by arbiter |
| 4 | Switch over<br>* First driven inactive by arbiter then |

-continued

| BIT | DESCRIPTION |
|---|---|
|  | released to high impedance |
| 5 | ID Acknowledge<br>* Driven "1" by device with matching ID to indicate that it will send a signal event<br>* If un-driven then it defaults to "0" and bits 6–23 are skipped |
| 6–13 | Signal Event (high byte)<br>* Only transmitted if the ID acknowledge was asserted<br>* Bit 6 contains the most significant bit<br>* Contains the 4 bit function code and part of the data field (see Event Definition) |
| 14 | Event in Progress<br>* Always "1"<br>* Used only to prevent a "break" (10 "0" bits) from being buried in the signal event |
| 15–22 | Signal event (low byte)<br>* Only transmitted if the ID acknowledge was asserted<br>* Contains the least significant byte of the data field (see Event Definition below)<br>* Bit 22 contains the least significant bit |
| 23 | Switch Over<br>* First driven inactive by the device with matching ID then released to high impedance<br>* A start bit can begin in the next clock cycle to initiate another invitation |

It is not necessary for the link bus arbiter to circulate ID codes that are never utilized. Consequently the link bus arbiter could be programmable to allow some ID codes to be excluded. However, this will not have a large impact on worst case latency. For simplicity, it is considered to be sufficient to always cycle through each ID code from 0 to 7.

The problem of loss of synchronization is handled by providing a "break" signal from the arbiter after each set of eight invitations, to facilitate resynchronization. If, for example, a device falsely detects a start bit, then it must be able to resynchronize within a brief period of time. For this purpose each device connected to the bus should monitor the bus to detect 10 consecutive low bits (called a "break"). Once a break is detected, each device should consider that the next "1" that is seen is a start bit. It is for this reason that bit 14 of the data packet is made always "1" (e.g. see FIGS. 6 and 7) to ensure that the data packet can never contain 10 consecutive zeros.

A full data packet consists of an invitation (start bit followed by an invitation ID), an invitation acknowledge, followed by a signal event. A signal event consists of a 4 bit function code followed by a 12 bit data field. The data field can also include an acknowledge from the target destination of the signal event. The following table contains some of the function definitions.

| FUNCTION CODE (4 BITS) | DATA FIELD (12 BITS) |
|---|---|
| Audio Record Sync | 12 bit Time stamp |
| Audio Playback Sync | 12 bit Time stamp |
| Graphics scan line count | 12 bit Time stamp |
| Video scan line count | 12 bit Time stamp |
| Service Request (0xE) | 10 bit service number<br>1 switch over bit (ignore data) |
| Service Complete (0xF)<br>(always paired with<br>Service request) | 10 bit service number<br>1 bit (not used)<br>1 bit service successful |

A service is a set of operations requested by one device (the source) and performed by another (the target).

A service request is sent by the source device and consists of a 10 bit service number indicating one of 1024 services to be performed, and a 1 bit acknowledge from the target device indicating that the service request was received. It is important that the host CPU 15 should allocate unique service numbers to each target so that two request receivers will not accept the same service number.

A service complete message is sent by the receiver of a service request to indicate that it has finished processing the request. It also returns a 1 bit flag indicating that the service was performed successfully or unsuccessfully. The service number it returns is the same as the service number that it received and acknowledged in the service request. If a service request is received and accepted by a device then it should return a completion message at some later time.

The operation is as follows. The graphics circuit 23, after receiving instructions from CPU 15 via bus 11, and one receiving a service request identifying one of the 1,024 services to be performed applies data into its VRAM memory space in memory 33, using its drawing engine as described in the aforenoted text Graphics Programming for the 8514/A, and as is well known using the ATI 68800 graphics controller. Data is applied to memory 33 at the bus 34 rate of up to 200 mb/s.

Input analog video signals to video controller 27 is converted therein to digital data, and under control of arbiter 39, using one of the 1,024 services indicated, stores that data in a second memory space of memory 33 via bus 34. Again, under polling control of arbiter 39, data compression circuit 25 performs one of the 1,024 designated services, retrieving the video data from memory 33, compressing it, and storing the compressed data in memory 33 at a memory space, thus allowing more digital video to be overwritten in the second memory space of memory 33.

One of the 1,024 services performed by graphics circuit 33 is to merge drawn graphics with video. This is performed by data compressor circuit 25 retrieving the compressed data, decompressing it and storing it in memory 33 VRAM at a location controlled by graphics circuit 33, interleaved with drawn graphics information. This portion of memory 33 is continuously sequentially read, the output of which is sent to D/A converter 35, and is then applied to monitor 37 for display.

In addition, the data to be applied to D/A converter 35 or portions thereof can be passed via bus 34 into video controller 27 for outputting at a video output port before or after conversion to analog, for display on a television monitor, recording on a VTR, etc.

It is preferred that the 1,024 service request functions should be processed using firmware in each of the devices 23, 25, 27, etc.

Figure 9:
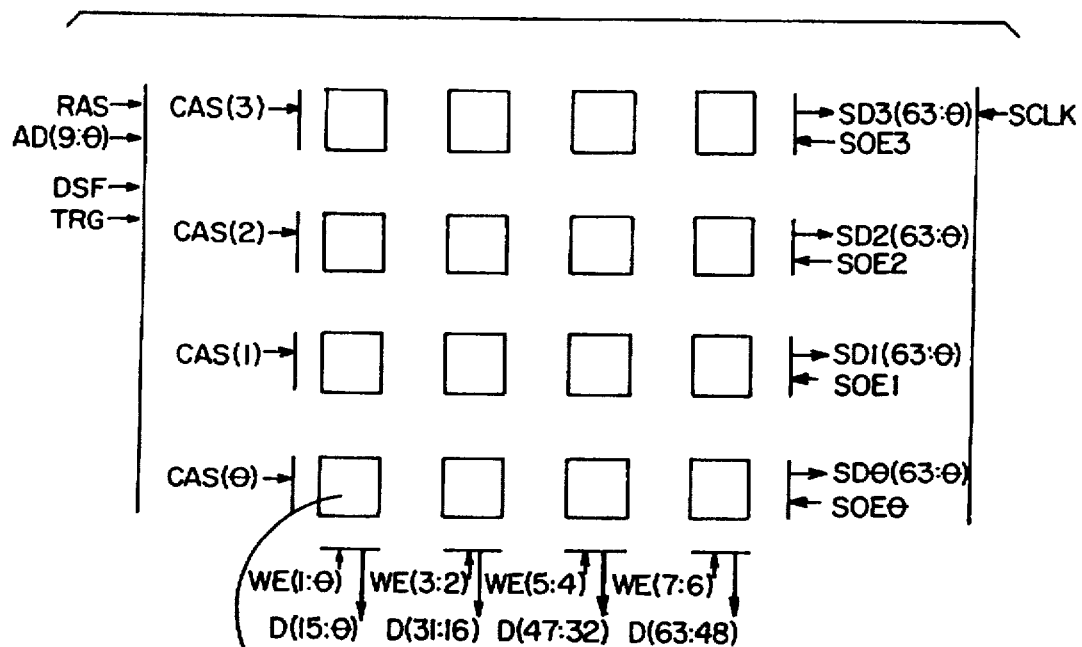
Figure 10:
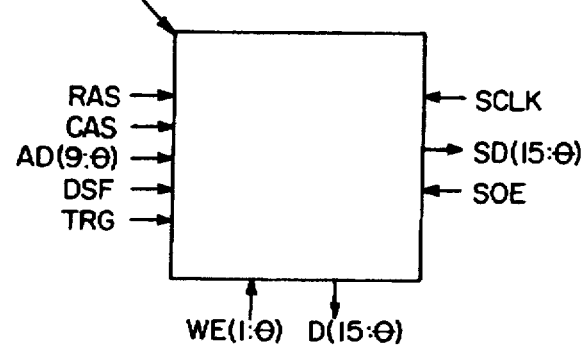

The memory 33 is preferably organized in a matrix as shown in FIG. 9. A memory unit of memory 33 is a memory device or multiple memory devices configured to have a preferably 16 bit data interface with byte-write enables. If multiple memory devices are used then the number of allowed rows in the matrix may have to be reduced to 16. The first row should be built using 1, 2 or 4 memory units, while the remaining rows in the memory matrix should be built up with complete rows. Each row in the matrix has its own CAS. DSF and TRG should be pulled inactive by resistors or sticky latches, so that a device on the memory bus 34 can be simplified to expect only a DRAM interface. If sticky latches are used, then DSF and TRG should be inactive when it gives up use of the bus 34.

RAS and CAS should be pulled high (inactive) e.g. using resistors or sticky latches, so that there are no glitches when control of the memory passes from one to another of circuits 23, 25, 27. There should be only one sticky latch or pull-up per signal. When a circuit 23, 25, 27 gives up use of bus 34 it should drive all control signals to the inactive state.

In general it is preferred that no persistent memory modes are used. However if a persistent write mask is set, or block write mode is enabled, it is up to the device that set these modes to clear them before giving up use of bus 34. Memory refresh can be provided by any of the circuits 23, 25, 27 which can arbitrate for the memory bus 34. Refresh should be provided on any such circuit which could stand alone as a user of the bus 34. Typically, however, the graphics controller should handle refresh.

It is preferred that a combination of DRAM and VRAM should be used for memory 33. The most economical solution is to use as much VRAM as necessary to support the highest monitor 37 resolution required with the rest of the memory built up of lower cost DRAM. Depending on the amount of memory used, the bus 34 can be of varying width (realistically 32 or 64 bits wide). Of course all devices should comply to the same data width.

In a successful prototype, using 4 Mbit parts, memory 33 could be made as large as 8 MBytes of DRAM and VRAM.

There should be no restrictions on how the display controller of the graphics circuit 23 uses the serial ports of the memories (if VRAM is used). Typical D/A converter specifications provide for serial port configurations to support 32, 64, or 128 bit wide architectures. FIG. 9 is configured for a 64 bit wide serial interface.

For the purpose of this disclosure, "quasi-synchronous" should be construed as: synchronous: using the rising edge of the clock 31 pulses. "quasi": refers to the fact that clock trees/skews, different chip processes, I/O delays, board delays etc. may make true synchronous behavior impossible—signals could arrive early (short path), or late (long path).

The memory 33 is shared among the various devices 23, 25, 27 by the arbiter 39. The devices make requests to the arbiter, and the arbiter returns a grant to the winning device. This device then has exclusive use of the memory until the grant signal is revoked.

Requests are preferably made quasi-synchronously on any clock pulse. A device 23, 25, 27 signals its request to arbiter 39 on bus 41, to access memory 33 by asserting a 2 bit code:

| | |
|---|---|
| 0 0 | high priority |
| 0 1 | med. priority |
| 1 0 | low priority |
| 1 1 | no request |

A priority code should be held stable for a time of at least 3 clock pulses. After this period of time a requesting circuit may change its priority. This allows the receipt of quasi-synchronous requests.

A device signifies (to the arbiter) that it is releasing bus 34 by asserting a no request priority code as described earlier.

Dropping to a lower priority request indicates that a device is trying to park on the bus 34. This case would be used for instance by the graphics controller 23. It would seize the bus 34 at high priority for display cycles, then would drop to a lower priority for host CPU access or drawing operations. Another use of parking is to allow the last device on the bus to retain it even if it doesn't have any pending cycles. As long as no other device needs the bus 34, the most common user of it preferably maintains its seizure of the bus so that arbitration latency is reduced.

The priority code should be maintained through to the time that a device gives up the bus 34. This is needed to allow the circuit using the memory to manipulate RAS as necessary.

Once the bus 34 has been released, the arbiter 39 looks at current bus requests and issues a device specific grant within two memory clock pulses.

Upon receiving a grant, the devices 23, 25, 27 can use the bus 34 for as long as necessary but it can have access for at least N bus cycles, where N is a programmable number, 8 being a suggested default. A circuit 23, 25, 27 can give up use of the bus either for example in the case of single reads, writes, serial transfer cycles etc.

A device is forced off of the bus by its grant being removed. The device should be allowed to finish its N cycles before giving up the bus, preferably at all times. Even if a device has had the bus for many cycles, after grant is removed, up to another N cycles can be performed. As the arbiter does not count cycles, it is up to the bus using device to be fair.

It should be noted that once a device has been granted use of the memory bus 34, it should be free to do whatever it wants to its share of the memory 33 space. This can include running bus cycles at a speed other than that of clock 31. In such a case, the length of bursts should still be limited to the equivalent of 8 clock based cycles.

If there is a good reason for forcing cessation of use of the bus by a device immediately, then a preempt terminal can be added to each device and the arbiter. If this terminal is asserted, then the bus using device finishes its current CAS cycle and gives up the bus whether or not N cycles have been completed.

The priority algorithm operated by the arbiter 39 should be very simple so that the arbiter can be implemented in a PAL or simple FPGA or ASIC. According to the algorithm, the highest priority request should be given the grant to use the bus. If there are numerous high priority requests, these can be serviced in a fixed priority scheme. In this manner, one device can be ensured to have exclusive access to the bus, e.g. the graphics controller.

If there are numerous medium priority requests, these requests should be serviced round-robin.

If there are numerous low priority requests, these requests should also be serviced round-robin. If a device has been insufficiently serviced, then it can increase its request severity.

At a clock rate of 50 MHz, there is only 20 ns for a request to get to the arbiter. Since clock skew could be significant, the above-described architecture allows for quasi-synchronous requests, dealt with by the arbiter.

In case the request path delay is very close to the clock frequency, or very fast, a request could get incorrectly sampled. This situation is dealt with by a "hold a request for at least 3 clocks" rule. The arbiter checks the bus 41 for requests every clock. When it sense that there has been a change, it knows that the current request may be incorrect, so it should wait one clock cycle, then latch in a guaranteed good request. Due to clock skew and signal delay, the requests could appear as a short path or a long path. For a long path, holding the request for two clocks would be sufficient; for a short path, 3 clocks are considered necessary, and thus the rule was generalized to always hold for three clocks.

Figure 11:
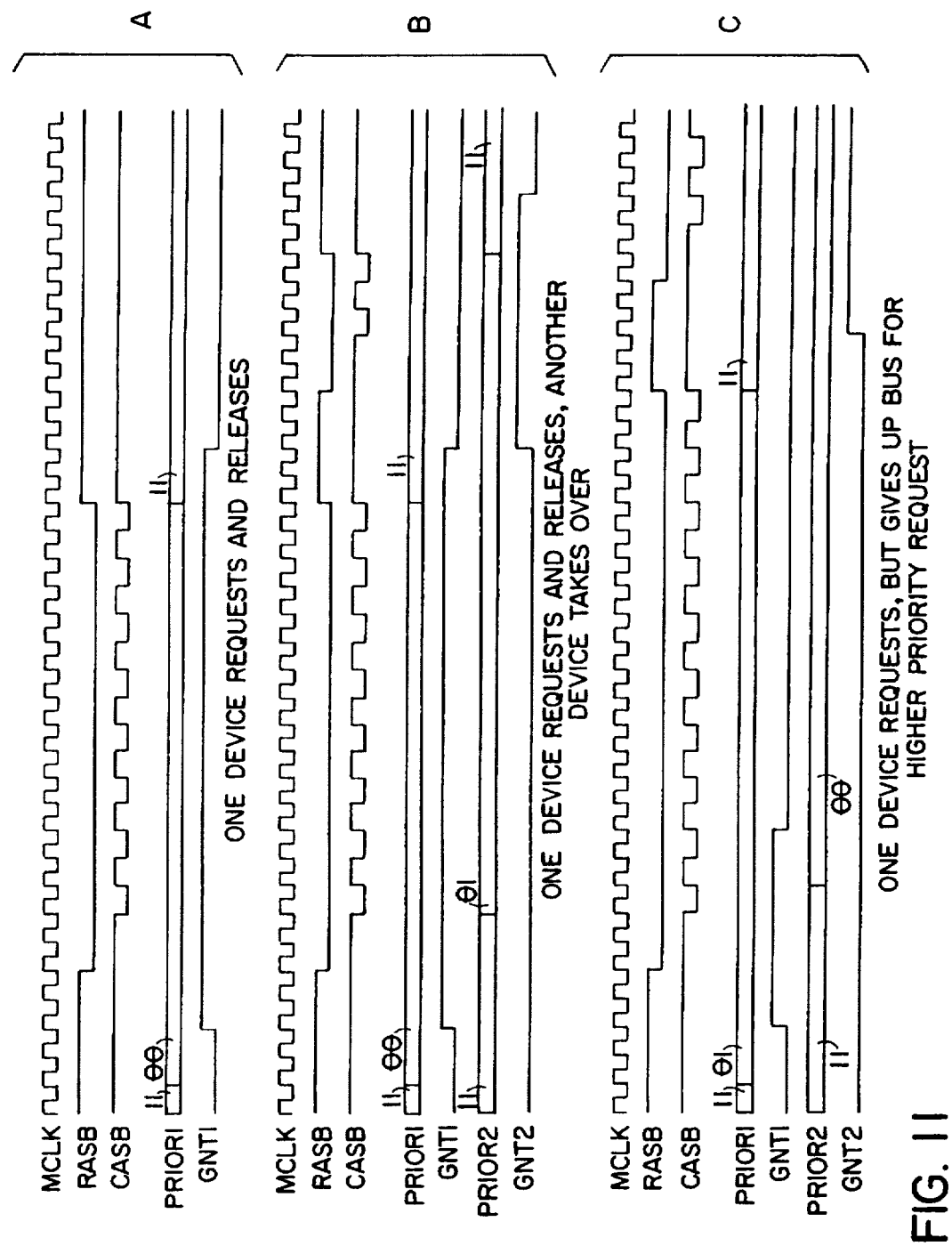

FIG. 11 illustrates arbiter waveforms, waveform group A in the situation of one circuit requesting and releasing, group B when one device requests and releases, and another device takes over, and group C when one device requests, but gives up the bus for a higher priority request.

With clock 31 operating at 50 MHz, a 20 ns period, the maximum theoretical bandwidth available on bus 34 is 200 MBytes/sec. It is assumed that the memory is always used in page mode, and that a page cycle can be completed in two memory clocks. Clearly this rate is sufficient to process and display video graphics or both in a real time or near real time basis. Yet the CPU 15 is used sparingly, and can service the lower data rate devices connected to bus 11 in a highly efficient manner. At the same time the amount of memory required is reduced from the prior art since video data is stored compressed, and the memory 33 is smoothly shared between devices, while synchronization is easily maintained and bandwidth maximized. In contrast to the prior art, there is no video data applied to the low data rate bus to which the CPU is connected thus allowing the maximum transmission of interrupts and CPU control signals on that bus. Since the control signals and video signals have two totally different bandwidth requirements, the present invention efficiently separates them allowing maximization of the efficiency of translation and manipulation of them.

A person understanding this invention may now conceive of alternative structures and embodiments or variations of the above. All of those which fall within the scope of the claims appended hereto are considered to be part of the present invention.

We claim:

1. A method of operating a computer system, comprising:

(a) under control of an arbiter, receiving video signals and storing data representations thereof in a first memory space, via a high bandwidth bus having a high bandwidth sufficiently high to carry video rate data signals, (b) reading the stored video signals, compressing them and storing them in a second different memory space than the first memory space via the high bandwidth bus, (c) storing graphic signals and display control signals in a third, different memory space than said first and second memory spaces, via the high bandwidth bus, (d) reading said memory spaces, decompressing the compressed video signals and displaying combined decompressed video and graphic signals as defined by the display control signals on a monitor to provide a multi-media image.

2. A method as defined in claim 1 wherein control by the arbiter includes sending a polling message sequentially to a graphic signals controller and to a video signals controller via a link bus, and wherein a polled controller sends an acknowledgment signal followed by a signal event signal, and wherein another controller recognizes at least part of the signal event signal and in response performs a service including requesting the high bandwidth bus for transmission or reception of high bandwidth signals to or from a corresponding memory space.

* * * * *